United States Patent
Cai et al.

(10) Patent No.: US 8,444,039 B2
(45) Date of Patent: May 21, 2013

(54) THERMALLY-INSULATED VIBRATION WELDING TOOL

(75) Inventors: Wayne W. Cai, Troy, MI (US); Paul F. Spacher, Rochester, NY (US); Edgar M. Storm, Jr., Spencerport, NY (US); Xingcheng Xiao, Troy, MI (US); Susan M. Smyth, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 11 days.

(21) Appl. No.: 12/971,875

(22) Filed: Dec. 17, 2010

(65) Prior Publication Data
US 2011/0186616 A1    Aug. 4, 2011

Related U.S. Application Data

(60) Provisional application No. 61/299,403, filed on Jan. 29, 2010, provisional application No. 61/324,785, filed on Apr. 16, 2010, provisional application No. 61/363,340, filed on Jul. 12, 2010.

(51) Int. Cl.
*B23K 20/00* (2006.01)
*B23K 20/10* (2006.01)

(52) U.S. Cl.
USPC ........ 228/1.1; 228/110.1; 228/111; 156/73.1; 156/580.1

(58) Field of Classification Search
USPC ............. 228/110.1, 1.1, 111; 156/73.1, 580.1
See application file for complete search history.

(56) References Cited

U.S. PATENT DOCUMENTS

| | | | | |
|---|---|---|---|---|
| 3,003,050 A * | 10/1961 | Correy | ........................... | 219/75 |
| 4,158,584 A * | 6/1979 | Clarke et al. | ................. | 156/73.1 |
| 4,770,730 A * | 9/1988 | Abe | ............................ | 156/73.1 |
| 5,147,082 A * | 9/1992 | Krause et al. | ................. | 228/1.1 |
| 5,775,055 A * | 7/1998 | Giacomelli et al. | ........ | 53/371.2 |
| 2004/0164129 A1 * | 8/2004 | Sonnenreich et al. | ..... | 228/180.5 |
| 2008/0272179 A1 * | 11/2008 | Kwan et al. | ................... | 228/59 |

* cited by examiner

*Primary Examiner* — Erin Saad
(74) *Attorney, Agent, or Firm* — Quinn Law Group, PLLC

(57) ABSTRACT

A welding assembly for forming a weld along a welding interface of a work piece(s) using vibrations includes a welding tool and a thermal barrier. The thermal barrier is at least a chemical and/or mechanical insulating layer positioned adjacent to the welding tool, which minimizes the rate of dissipation of heat generated by the vibrations at or along the welding interface. The welding assembly may also include a wear-resistant layer adjacent to the thermal barrier, which protects the thermal barrier from damage or wear. The welding tool is a portion an anvil assembly and/or a sonotrode assembly. A method of insulating a welding tool includes applying or connecting a thermal barrier to a surface of the welding tool, and minimizing the rate of dissipation of heat generated by the vibrations at or along the welding interface using the thermal barrier, which includes an insulating layer.

8 Claims, 2 Drawing Sheets

THERMALLY-INSULATED VIBRATION WELDING TOOL

CROSS-REFERENCE TO RELATED APPLICATIONS

This application claims priority to and the benefit of U.S. Provisional Patent Application No. 61/299,403, filed Jan. 29, 2010, U.S. Provisional Patent Application No. 61/324,785, filed Apr. 16, 2010, and U.S. Provisional Patent Application No. 61/363,340, filed Jul. 12, 2010, which are hereby incorporated by reference in their entireties.

TECHNICAL FIELD

The present invention relates to a vibration welding system having one or more thermally-insulated welding tools.

BACKGROUND

In a vibration welding process, e.g., ultrasonic welding, adjacent surfaces of a work piece or multiple work pieces are joined together by applying a calibrated vibration to the work piece. The work piece is clamped while the calibrated vibration is transmitted through its structure. The vibration creates surface friction along interfacing surfaces of the work piece. The resultant heat softens the interfacing surfaces, thus bonding the work piece to form a weld.

A vibration welding system includes various welding tools, including a welding horn or sonotrode which vibrates when energized, and which is connected to or formed integrally with one or more welding pads. The welding pads include knurls or other textured surface features that physically contact the work piece. Similar knurls may be present on an anvil, which is another of the welding tools, with the work piece being tightly clamped between the anvil and the sonotrode. The anvil may also include a relatively large piece of metal providing the required rigidity for opposing the sonotrode, with this additional piece of metal referred to herein as a welder body.

SUMMARY

Accordingly, a welding assembly is provided for forming a weld along a welding interface of a work piece(s) using vibrations. The assembly includes a welding tool and a thermal barrier. The thermal barrier is positioned adjacent to the welding tool, and is configured to minimize the rate of dissipation of heat generated by the vibrations at or along the welding interface.

The thermal barrier may include an insulating layer connected or applied to the welding tool, and optionally a wear-resistant layer applied to the insulating layer. The thermal barrier may be a chemical layer applied to a desired surface of the welding tool, e.g., to a knurl pattern of a welding tool or internal to the welding tool, and/or a mechanical layer connected to the surface of the welding tool.

The welding tool may be a portion of an anvil assembly and/or of a sonotrode assembly. In one embodiment, the welding tool includes a body portion and a removable or modular head portion. The body and head portions may define a plurality of air gaps adjacent to the thermal barrier in one embodiment.

As noted above, the welding tool may be a portion of an anvil assembly. Thus, an insulated anvil assembly is also disclosed, which includes an anvil body, an anvil head, and a thermal barrier. The anvil head is positioned adjacent to the anvil body, and the thermal barrier is connected or applied to the anvil body and/or the anvil head. The thermal barrier is configured to minimize the rate of dissipation into the anvil body of any heat that is generated by a vibrating sonotrode.

A vibration welding method includes positioning a thermal barrier adjacent to one of a body and a head of a first welding tool, and positioning a work piece between the head and a second welding tool. The method further includes using a power supply to cause one of the first and second welding tools to vibrate, and then minimizing, via the thermal barrier, the rate of dissipation into the body of the first welding tool body of any heat generated by the particular welding tool that is caused to vibrate.

The above features and advantages and other features and advantages of the present invention are readily apparent from the following detailed description of the best modes for carrying out the invention when taken in connection with the accompanying drawings.

DESCRIPTION

Figure 1:
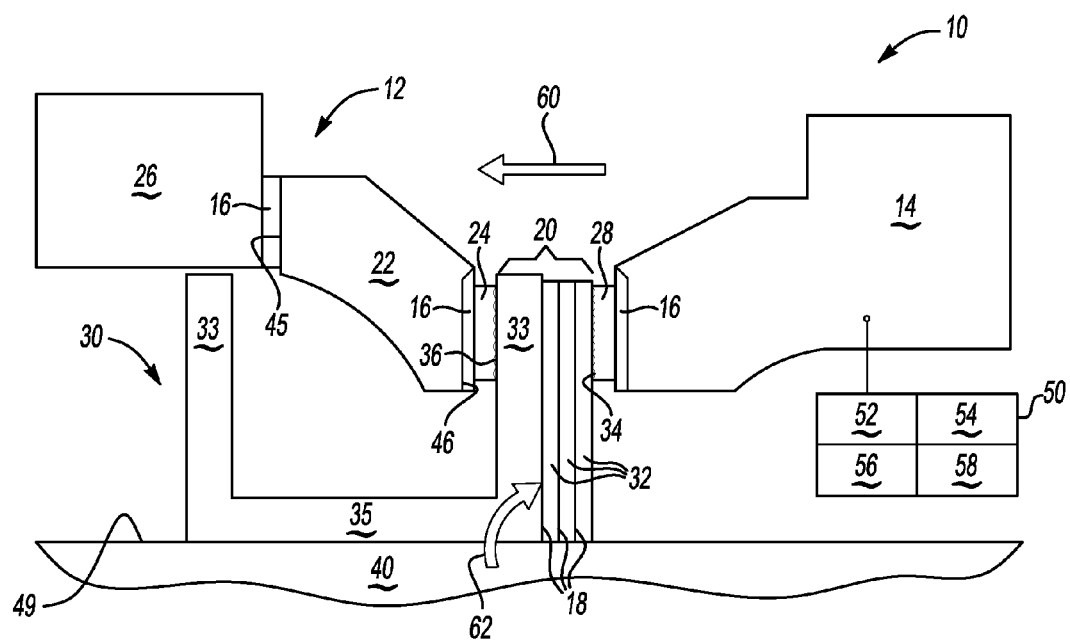
FIG. 1 is a schematic side view illustration of a vibration welding system having thermally insulated welding tools.

Referring to the drawings, wherein like reference numbers refer to like components, and beginning with FIG. 1, a vibration welding assembly 10 is adapted for forming a welded joint using a vibration welding process, such as but not limited to an ultrasonic welding process. The welding assembly 10 may include different welding tools 38 (see FIGS. 2 and 4), including an anvil assembly 12 and a sonotrode assembly 14. A thermal barrier 16 is applied or connected to one or more of the various welding tools as disclosed below. Use of the thermal barrier 16 optimizes the welding temperature at or along one or more welding interfaces 18 of a given work piece 20 that is vibration welded using the welding assembly 10. Three such welding interfaces 18 are shown in the embodiment of FIG. 1, although more or fewer welding interfaces may be used.

The anvil assembly 12 includes an anvil body 22, an anvil head 24, and a welder body 26, one or more of which may use the thermal barrier 16. The welder body 26 is a relatively large piece of metal providing the required mass for opposing the sonotrode assembly 14. The welder body 26 is fastened to or otherwise joined with the anvil body 22. The sonotrode assembly 14, which may or may not use thermal barrier 16 depending on the embodiment, includes at least one welding pad 28. Together, the anvil assembly 12 and the sonotrode assembly 14 form a weld in the work piece 20. The work piece 20 represented in FIG. 1 as a conductive bus bar or interconnect member 30 and conductive battery tabs 32 of a vehicle battery 40, only the interconnect board portion of which is shown in FIG. 1 for simplicity.

Each welding pad 28 of the sonotrode assembly 14 may include knurls 34, e.g., raised bumps or ridges, or another textured surface pattern providing sufficient friction. The anvil head 24 likewise has similar knurls 36. The knurls 34 and 36 are adapted to facilitate secure gripping of the work piece 20 from its opposite sides.

Figure 4:
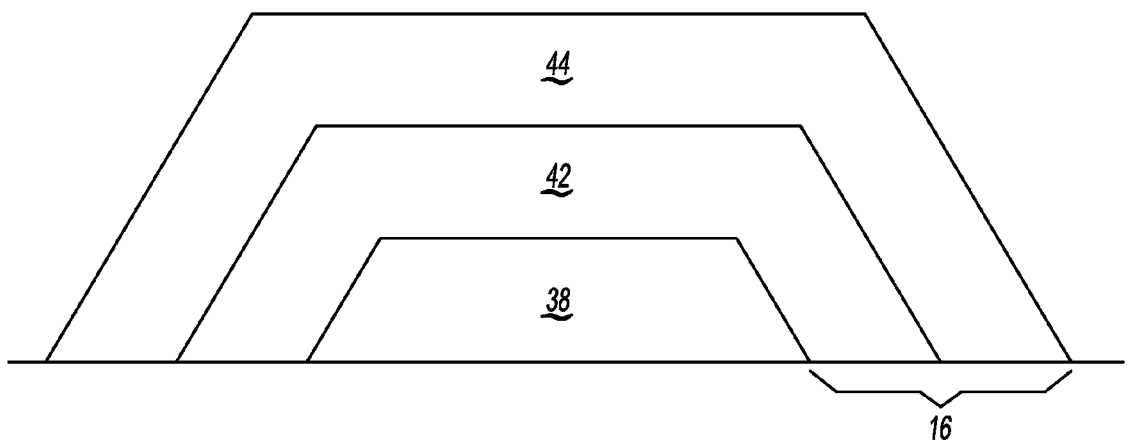
FIG. 4 is a schematic view of a multifunctional coating usable with a welding tool within the welding system shown in FIG. 1.

Referring briefly to FIG. 4, the thermal barrier 16 enhances the thermal characteristics within the welding system 10 of FIG. 1 using at least an insulating layer 42. The insulating layer 42 is applied or connected to a surface of any desired welding tool 38, e.g., any component of the anvil assembly 12 and/or the sonotrode assembly 14 shown in FIG. 1. A wear-resistant layer 44 may be used to help increase the wear resistance of the insulating layer 42. Layers 42 and 44, when used together, respectively insulate and protect whatever welding tool 38 the layers are applied or connected to in order to minimize a rate of dissipation of heat away from the welding interfaces 18 shown in FIG. 1. For example, when applied to or used with the anvil assembly 12, the welding temperature may be substantially increased by retaining heat near the welding interfaces 18, thus allowing heat to build faster than it can dissipate. The thickness and chemical properties of the insulating and wear-resistant layers 42 and 44, respectively, may be selected to provide the desired the level of welding temperature enhancement.

Referring again to FIG. 1, the thermal barrier 16 can be applied or connected to different welding tools, such as the welder body 26, the anvil body 22, the anvil head 24, the welding pads 28, and/or other portions of the sonotrode assembly 14. Some possible positions for the thermal barrier 16 include between the anvil body 22 and the welder body 26 on a first side 45 of the anvil body. The anvil head 24 is connected to the anvil body 22 on a second side 46 of the anvil body, with the welder body 26 providing rigidity on the first side 45 opposite the second side. The anvil head 24 may be brazed, bonded, or mechanically fastened to the anvil body 22 and then heat treated or after heat treated. The knurls 36 or other desired textured surface pattern may be ground onto the anvil head 24 after heat treating in order to provide the desired friction surface for conducting the vibration welding process.

As discussed below with reference to FIGS. 2 and 3, the thermal barrier 16 may also be embodied as a mechanical structural layer, e.g., a solid plate fastened to the welder body 26. In another embodiment, the thermal barrier 16 may be alternatively configured as a thin shim, i.e., a slim tapered or wedged piece of material, a spring, or other suitable mechanical structure as opposed to an applied chemical coating or layer. The shim and/or spring may be constructed from an insulating material and/or coated with an insulating coating of the type described above, as shown in FIG. 4.

In the specific embodiment shown in FIG. 1, the work piece 20, which is used in the singular to refer collectively to all pieces being welded together, includes the conductive tabs 32 of the battery 40. The battery 40 may be a high-voltage battery capable of selectively powering a hybrid electric vehicle (HEV), an electric vehicle (EV), a plug-in hybrid electric vehicle (PHEV), and the like. The conductive tabs 32 form electrode extensions of given battery cells, and are each internally-welded to the various anodes and cathodes comprising that particular battery cell. However, the work piece 20 is not limited to a battery, and may be a structural portion of any weldable object.

Also shown in the embodiment shown in FIG. 1, the bus bar or conductive interconnect member 30 can be used to electrically connect the various conductive tabs 32 of the battery 40 to each other. The interconnect member 30 may be constructed of a suitable conductive material, e.g., copper, and may be shaped, sized, and/or otherwise configured to form a rail or bus bar, and mounted to the battery 40. The interconnect member 30 may have a generally U-shaped cross section in one embodiment, i.e., a pair of upright rails 33 joined by a horizontal base 35, with the base resting on a horizontal surface 49 of the battery 40. Each upright rail 33 may be positioned adjacent to the conductive tabs 32, clamped between the anvil assembly 12 and the sonotrode assembly 14, and welded to the tabs using welding control equipment 50.

To properly drive and control the welding process, the welding control equipment 50 may include a welding power supply 52 which transforms an available source power into a form that is more conducive to vibration welding. A power supply of the type typically used in a vibration welding process, such as the power supply 52, can be electrically-connected to any suitable energy source, e.g., a 50-60 Hz wall socket. The power supply 52 may include a welding controller 54, a device which is usually but not necessarily included as part of the power supply.

The power supply 52 and the welding controller 54 ultimately transform source power into a suitable power control signal having a predetermined waveform characteristic(s) suited for use in the vibration welding process, for example a frequency of several Hertz (Hz) to approximately 40 KHz, or much higher frequencies depending on the particular application. The welding control equipment 50 may further include a power converter 56 and a booster 58. The power converter 56 has the required mechanical structure for producing a mechanical vibration or oscillation signal in the welding pad(s) 28. The booster 58 may be used as needed to amplify the amplitude of vibration, and/or for changing a direction of any applied clamping force.

As sonotrode assembly 14 clamps against the anvil assembly 12 in response to the applied clamping force, the sonotrode vibrates at a calibrated frequency and amplitude to thereby generate friction and heat at welding interfaces 18. However, the anvil assembly 12 and the interconnect member 30 each act as heat sinks, and therefore heat may be lost as energy is transmitted in a direction away from the sonotrode assembly 14 and toward the anvil assembly 12 in the direction indicated by arrow 60. Potentially, the innermost weld, with its position indicated by arrow 62, i.e., the farthest weld from the sonotrode assembly 14, may be formed with the lowest temperature and thus the lowest bonding strength. This heat sink effect may be reduced by using the thermal barrier 16 described below and shown in FIG. 4.

Figure 2:
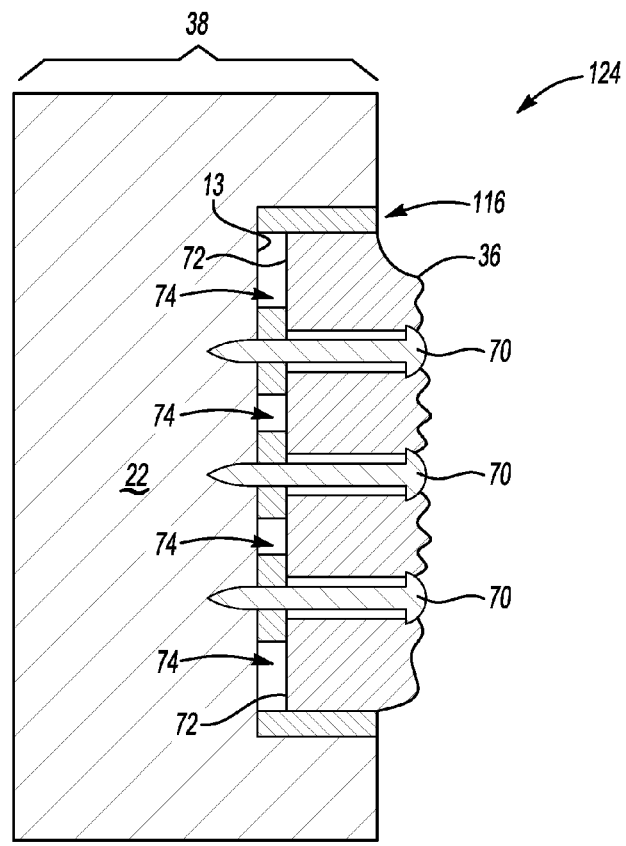
FIG. 2 is a schematic cutaway view of an anvil assembly that is usable as a welding tool with the welding system shown in FIG. 1.
Figure 3:
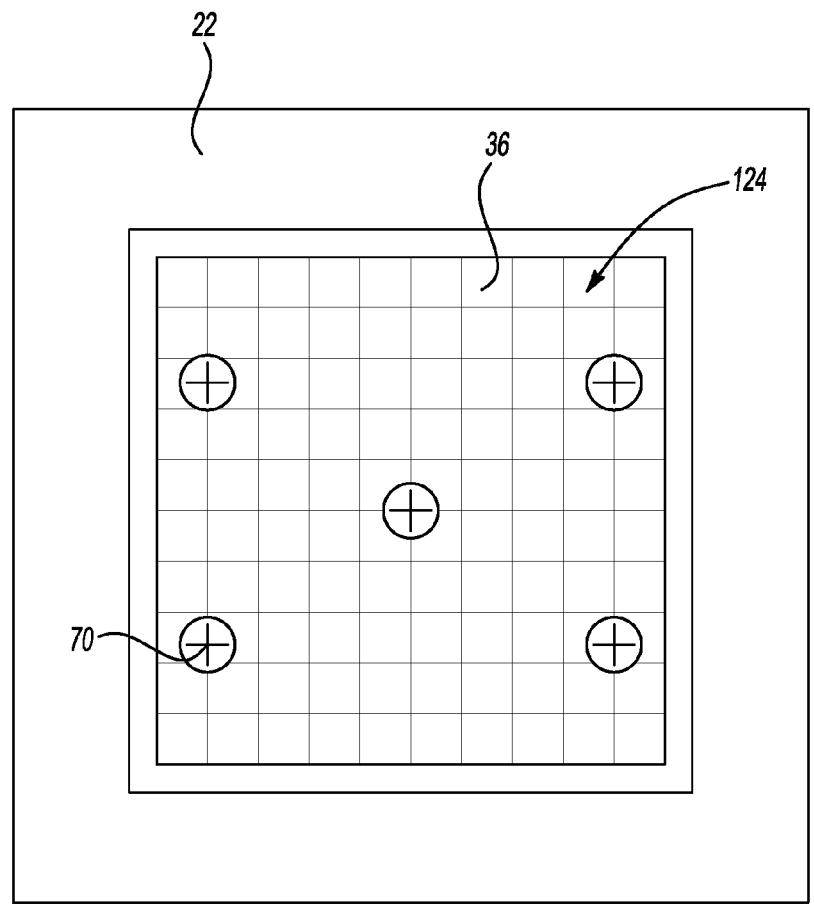
FIG. 3 is another schematic illustration of an anvil assembly of the type shown in FIG. 2.

Referring to FIGS. 2 and 3 together, in one possible embodiment the welding tool 38, shown as a welding anvil assembly, may include the anvil body 22 and an anvil head 124. FIG. 2 shows the anvil body 22 and the anvil head 124 in schematic cutaway side view to show some of the internal components used in this embodiment. However, FIG. 2 is not intended to be a true cross-sectional view of FIG. 3. For example, the bolt patterns may vary as shown. In this embodiment, the anvil head 124 can be fastened to the anvil body 22 using fasteners 70, e.g., bolts or screws to provide a modular design, and/or by direct bonding and/or press-fitting, depending on the embodiment. The anvil head 124 of FIG. 2 differs from the anvil head 24 of FIG. 1 in its use of a mechanical thermal barrier 116 and optional air gaps 74. While an anvil head 124 is described herein, the embodiment shown in FIGS. 2 and 3 may also be used on the side of sonotrode assembly 14, e.g., as part of the welding pad 28 shown in FIG. 1.

In various embodiments, the thermal barrier 116 may be constructed as thermally-insulated shims, or as springs disposed between the modular anvil head 124 and the anvil body 22. As with the thermal barrier 16 described above, the thermal barrier 116 may be constructed of and/or coated with a ceramic material such as Yittra stabilized zirconia, or lanthanum aluminate, a glass such as zircon, metal-glass composite, and/or other suitable materials. Polyimide film may be used to coat the thermal barrier 116 in another embodiment.

In various embodiments, the thermal barrier 116 may be constructed as thermally-insulated shims, or as springs disposed between the modular anvil head 124 and the anvil body 22. As with the thermal barrier 16 described above, the thermal barrier 116 may be constructed of and/or coated with Yittra stabilized zirconia, alumina, lanthanum aluminate, zircon, metal-glass composite, and/or other suitable materials. Polyimide film may be used to coat the thermal barrier 116 in another embodiment.

The optional air gaps 74 are shown in conjunction with the thermal barrier 116 in FIG. 2, however the air gaps, if used at all, may also be used with applied coating-type thermal barrier 16 of FIG. 1, e.g., by leaving sufficient space between the anvil body 22 and the anvil head 124, as well as by inserting the springs or shims shown in FIG. 2 into such a space. The actual size, shape, and distribution of the air gaps 74 and thermal barriers 16 or 116 may vary in accordance with the intended design to further optimize the temperature properties at the welding interfaces 18 shown in FIG. 1.

Referring to FIG. 4, it is recognized herein that a desired temperature of the welding interfaces 18 of FIG. 1, and in particular of the innermost welding interface, e.g., between the interconnect member 30 and an adjacent battery tab 32, may be achieved in one manner by passively preventing transfer or dissipation of heat energy into the anvil assembly 12. Such prevention isolates frictional heat to the interconnect member 30, thus allowing heat to build at the welding interfaces 18 where it can be usefully employed to increase weld strength.

In the embodiment of FIG. 4, insulation of a desired welding tool is provided via the thermal barrier 16. The anvil head 22 of FIG. 1, for instance, may be the welding tool 38 of FIG. 4 that is coated with the insulating layer 42, which provides a thermal barrier and substantially prevents thermal dissipation into the material of the anvil 12, or any other welding tool protected in this manner. Full use is thus made of any frictional heat. In one embodiment, the insulating layer 42 may be approximately 5 microns ($\mu$) to approximately 25$\mu$ in thickness. Materials such as Yittra-stabilized zirconia, alumina, lanthanum aluminate, zircon, metal-glass composite, or other suitable materials may be used for constructing the insulating layer 42.

The wear-resistant layer 44 provides improved wear resistance while preventing material, e.g., aluminum or copper, from the work pieces 20 of FIG. 1 from sticking to the anvil head 24. Layer 44 may also be approximately 5-25$\mu$ in thickness, although other thicknesses may also be provided depending on the material selection and intended use. Materials such as microcrystalline/nanocrystalline diamond, diamond-like carbon with hydrogen termination, or other suitable materials may be used for constructing the layer 44.

Accordingly, in practice one may position the thermal barrier 16, 116 between a surface of the anvil body 22 and the anvil head 24, and then position a work piece 20 between the anvil head and the sonotrode 14. The sonotrode 14 is energized using the power supply 52, via the controller 54, to cause the sonotrode to vibrate. The thermal barrier 16, 116 thus is used to minimize a rate of dissipation into the anvil body 22, or of the anvil head 124 shown in FIGS. 2 and 3, of any heat that is generated by the vibrating sonotrode 14.

Using the above designs in a vibration welding method, one may position the thermal barrier 16 and/or 116 between a body and a head of a first welding tool, e.g., the anvil body 22 and anvil head 24, and a work piece such as the work piece 20 of FIG. 1 between the head and a second welding tool, e.g., the sonotrode 14. The power supply 52 can be controlled to cause the sonotrode 14 vibrate. The thermal barrier 16 and/or 116 is then used to minimize a rate of dissipation into the body of the first welding tool of any heat that is generated by the sonotrode 14.

While the best modes for carrying out the invention have been described in detail, those familiar with the art to which this invention relates will recognize various alternative designs and embodiments for practicing the invention within the scope of the appended claims.

The invention claimed is:

1. A welding assembly for forming a weld along a welding interface of a work piece using vibrations, the assembly comprising:
   an anvil assembly having an anvil body and an anvil head;
   a sonotrode assembly that clamps against the anvil, vibrates at a calibrated amplitude and frequency, and generates friction and heat at the welding interface, thereby forming the weld; and
   a thermal barrier positioned between the anvil body and the anvil head, wherein the thermal barrier includes a thermal insulating layer constructed essentially of at least one of: Yittra-stabilized zirconia, alumina, lanthanum aluminate, zircon, and metal-glass composite and having a thickness of approximately 5 microns to approximately 25 microns;
   wherein the thermal barrier is configured to minimize a rate of dissipation into the anvil assembly from the welding interface of heat that is generated by the vibrations of the sonotrode assembly, such that heat builds at the welding interface faster than the heat can dissipate from the welding interface.

2. The welding assembly of claim 1, wherein the thermal barrier further includes a wear-resistant layer positioned adjacent to the insulating layer.

3. The welding assembly of claim 1, further comprising another thermal barrier positioned within the sonotrode assembly.

4. The welding assembly of claim 1, wherein the insulating layer includes a mechanical structural layer connected to the anvil body.

5. The welding assembly of claim 1, wherein the anvil body, the anvil head, and the insulating layer together define a plurality of air gaps adjacent to the thermal barrier.

6. A welding assembly for forming a weld along a welding interface of a work piece using vibrations, the assembly comprising:
   an anvil assembly having an anvil body and an anvil head;
   a sonotrode assembly that clamps against the anvil, vibrates at a calibrated amplitude and frequency, and generates friction and heat at the welding interface, thereby forming the weld;
   a thermal barrier positioned between the anvil body and the anvil head, wherein the thermal barrier includes an insulating layer having a thickness of at least 5 micron that is selected from the group consisting essentially of: ceramic, mineral, laminated metal, and metal-glass composite; and
   a wear-resistant layer positioned adjacent to the insulating layer;
   wherein the thermal barrier is configured to minimize a rate of dissipation into the anvil assembly from the welding interface of heat that is generated by the vibrations of the sonotrode assembly, such that heat builds at the welding interface faster than the heat can dissipate.

7. The welding assembly of claim 6, wherein the wear-resistant layer is one of microcrystalline and nanocrystalline diamond.

8. The welding assembly of claim 6, wherein the anvil assembly further includes a welder body connected to the anvil body, the welding assembly further comprising:
   another insulating layer positioned between the welder body and the anvil body.

* * * * *